Dec. 27, 1938.　　　W. A. SCHAPER　　　2,141,254
HIGH FREQUENCY COUPLING DEVICE
Filed May 18, 1936　　　5 Sheets-Sheet 1

INVENTOR.
WILLIAM A. SCHAPER
BY Clemens H. Vig
ATTORNEY.

Dec. 27, 1938.    W. A. SCHAPER    2,141,254
HIGH FREQUENCY COUPLING DEVICE
Filed May 18, 1936    5 Sheets-Sheet 2

INVENTOR.
WILLIAM A. SCHAPER
BY Clemens H. Vig
ATTORNEY.

Dec. 27, 1938.  W. A. SCHAPER  2,141,254
HIGH FREQUENCY COUPLING DEVICE
Filed May 18, 1936   5 Sheets-Sheet 3
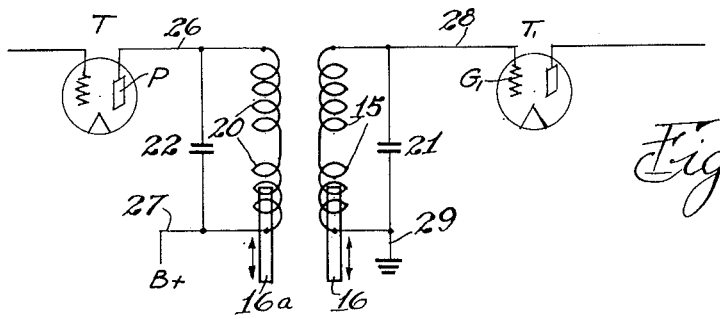
*Fig. 7*
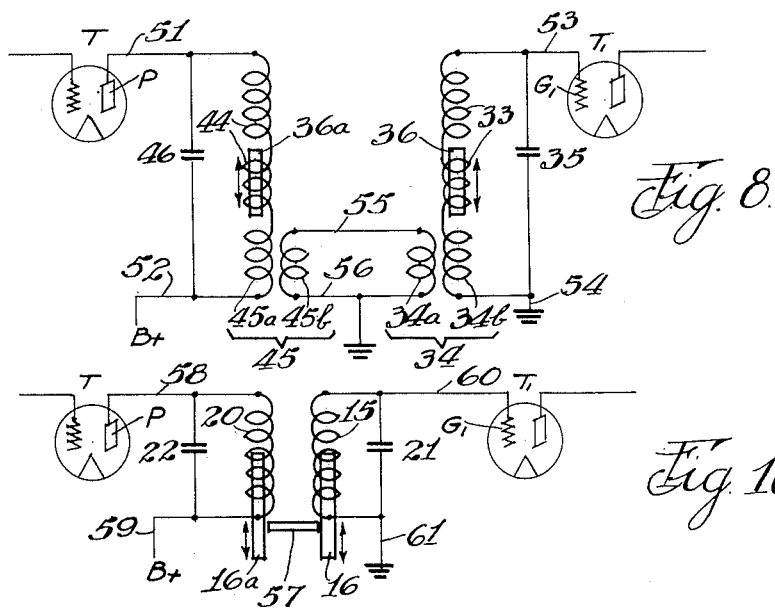
*Fig. 8*
*Fig. 10*
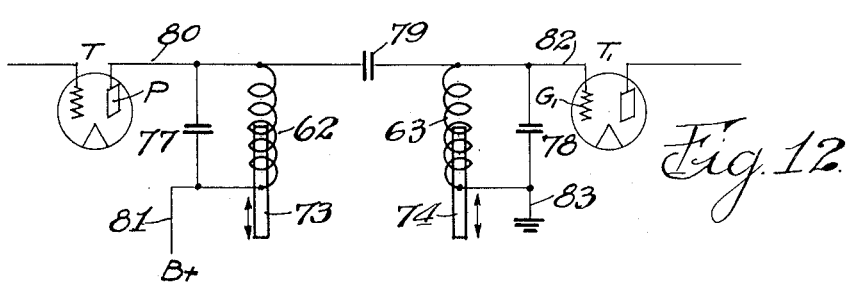
*Fig. 12*
INVENTOR.
WILLIAM A. SCHAPER.
BY Clemens H. Vig
ATTORNEY.

Dec. 27, 1938.  W. A. SCHAPER  2,141,254
HIGH FREQUENCY COUPLING DEVICE
Filed May 18, 1936   5 Sheets-Sheet 4
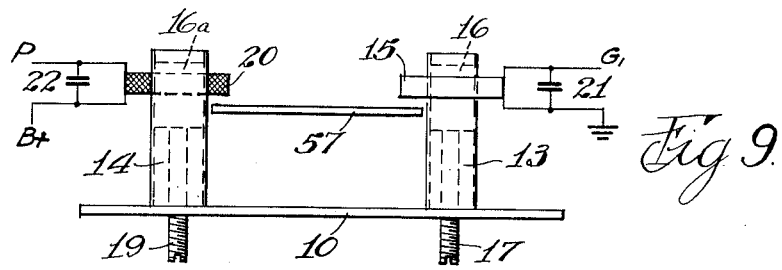
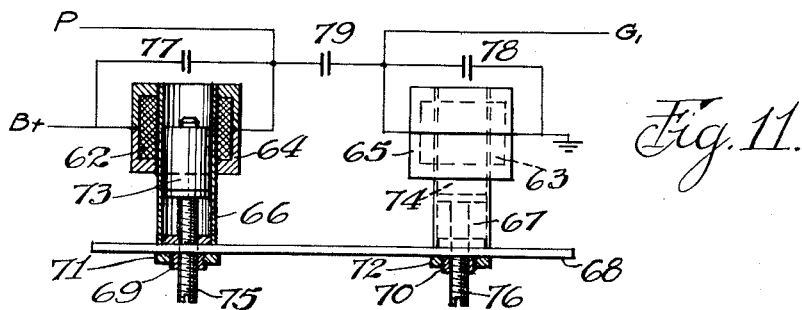
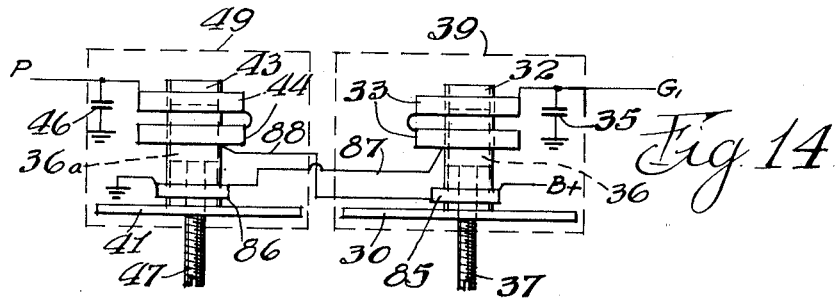
INVENTOR.
WILLIAM A. SCHAPER.
BY Clemens H. Vig
ATTORNEY.

INVENTOR.
WILLIAM A. SCHAPER.
BY Clemens H. Vig
ATTORNEY.

Patented Dec. 27, 1938

2,141,254

UNITED STATES PATENT OFFICE 2,141,254

HIGH-FREQUENCY COUPLING DEVICE

William A. Schaper, Chicago, Ill., assignor to Johnson Laboratories, Inc., Chicago, Ill., a corporation of Illinois Application May 18, 1936, Serial No. 80,233

6 Claims. (Cl. 178—44)

My invention relates to intermediate-frequency coupling devices for superheterodyne radio receivers, and particularly to those of the type employing an inductance coil or coils, and a core or cores of comminuted ferromagnetic material, compressed and held in solid form by a binder. The cores preferably are movable relatively to the coils to effect tuning, and a fixed capacitor or capacitors are provided for supplying the capacitance required to produce resonance at the desired intermediate frequency.

As is well known in the art, regardless of how carefully intermediate-frequency coupling devices may be made in the factory, and there adjusted to resonance at a desired frequency, such coupling devices cannot be exactly duplicated owing to practical limitations in manufacture. Furthermore, regardless of how carefully the receivers in which the coupling devices are to be used may be designed, constructed and wired to prevent it, different stages even in the same receiver differ in circuit capacitance, and receivers of different manufacture show even more marked circuit capacitance differences. It is thus always necessary for the manufacturer of such coupling devices intended for use by receiver manufacturers generally, to provide the coupling devices with suitable means for accurately tuning the coupling devices to resonance at the desired intermediate frequency, after the coupling devices have been incorporated in the receivers in which they are to be used, and the tuning means employed must have a substantial range to compensate for the circuit capacitance differences just referred to.

It is a principal object of my invention to so construct my intermediate-frequency coupling device that the electrical factors controlling selectivity and gain are maintained substantially constant throughout the tuning range of the coupling device, as below described.

My invention will be best understood by reference to the accompanying drawings illustrating several means preferably employed, in which Fig. 1 illustrates partly in side elevation and partly in vertical, sectional view, one form of my coupling device in which the coupling is inductive, this view being taken along the line 1—1 in Fig. 2;

Fig. 7 is a schematic circuit diagram of one use of the coupling device illustrated in Figs. 1 and 2;

Fig. 8 is a schematic circuit diagram of one use of the coupling device illustrated in Figs. 3 and 4;

Fig. 9 shows in diagrammatic side elevation, a coupling device of the kind illustrated in Figs. 1 and 2, provided additionally with magnetic coupling means;

Fig. 10 is a schematic circuit diagram of one use of the coupling device illustrated in Fig. 9;

Fig. 11 shows in diagrammatic side elevation, a coupling device in which the inductance coils are severally mounted in separate enclosing housings of ferromagnetic material, the coupling between the coils being capacitive;

Fig. 12 is a schematic circuit diagram of one use of the coupling device illustrated in Fig. 11;

Figure 3:
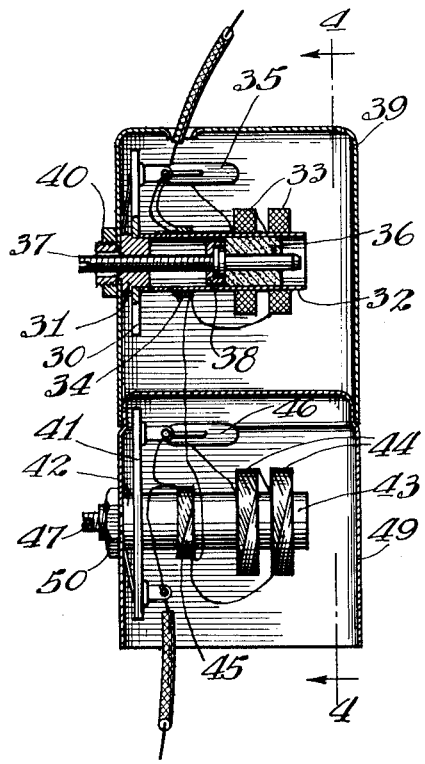
Fig. 3 shows in a view similar to Fig. 1 another form of my coupling device in which the coupling is effected inductively, this view being taken along the line 3—3 in Fig. 4.
Figure 4:
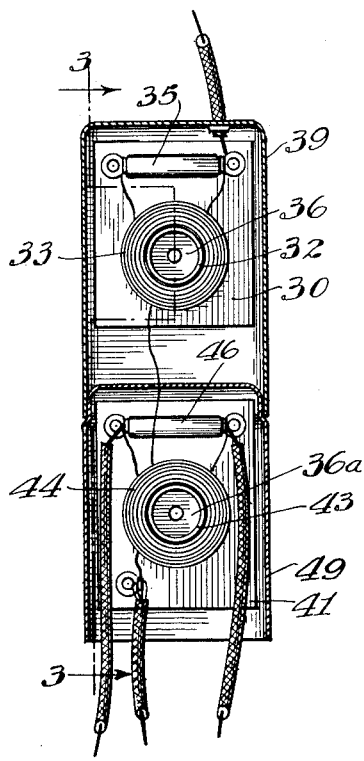
Fig. 4 shows in a view similar to Fig. 2 the device illustrated in Fig. 3, this view being taken along the line 4—4 in Fig. 3.
Figure 15:
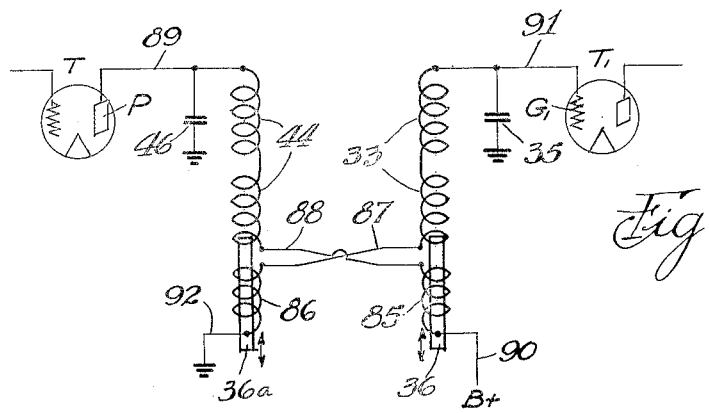
Figure 16:
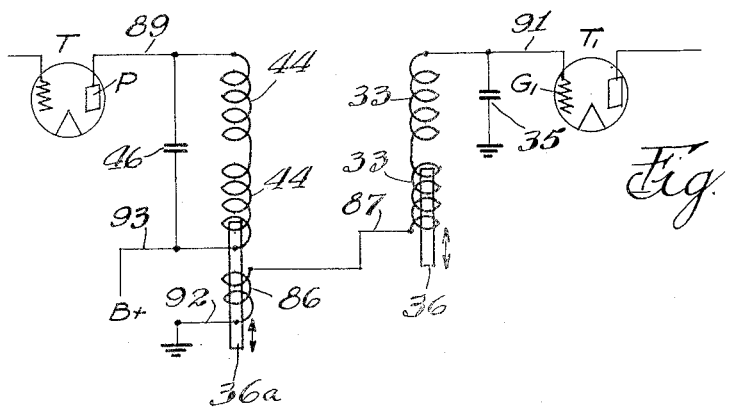

Fig. 14 shows in diagrammatic side elevation, a coupling device similar to that shown in Figs. 3 and 4, but differing from the latter in that the transfer winding of each unit of the coupling device is connected conductively with the inductance coil of the other unit of the device, instead of the arrangement in which the transfer windings are connected together in a loop conductively separate from the inductance coils of the device, as illustrated in Fig. 8;

Fig. 15 is a schematic circuit diagram of one use of the coupling device illustrated in Fig. 14; and Fig. 16 is a schematic circuit diagram of one use of a modified form of the coupling device illustrated in Fig. 14, in which only one transfer winding is employed, which transfer winding is inductively related to the inductance coil of the unit of which it is a part, and is conductively connected with the inductance coil of the other unit of the coupling device.

Similar numerals refer to similar parts throughout the several views.

Figure 1:
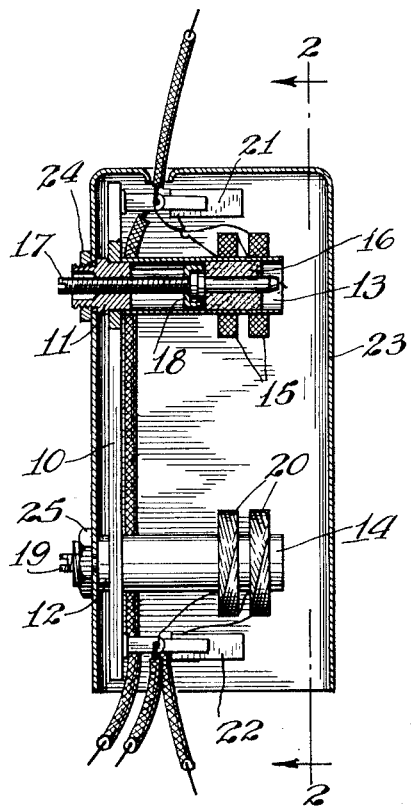
Figure 2:
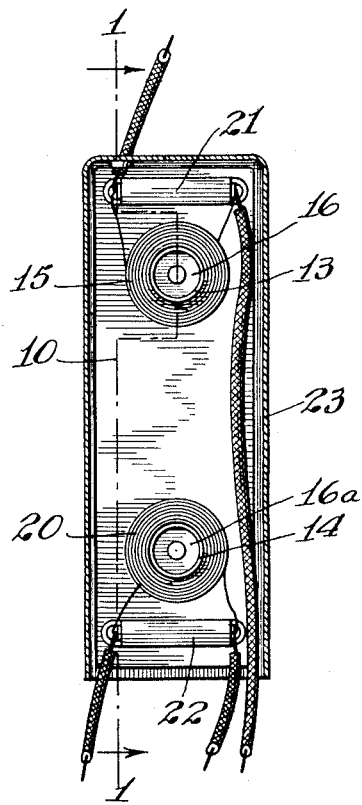
Fig. 2 is a vertical, sectional view through the casing shown in Fig. 1, and shows the internal parts of the device of Fig. 1 in front elevation, this view being taken along the line 2—2 in Fig. 1.

In Figs. 1 and 2, I illustrate a coupling device consisting of a base plate 10, supporting spaced and internally threaded plugs 11 and 12 of metal or other suitable material, on which plugs tubes 13 and 14 of insulating material are respectively mounted with their axes in parallel relation. The tube 13 supports an inductance coil 15, which is preferably made in two sections, and within the tube a core 16 of compressed ferromagnetic material is disposed with a free sliding fit, the core being connected with a screw 17 by an insulating connector 18, which screw extends through and fits the threads in the plug 11, whereby the core 16 may be moved longitudinally in the coil 15 as desired, by turning screw 17. The tube 14 contains a similar core 16a (Fig. 2), similarly connected with a screw 19 engaging the plug 12, for cooperation with an inductance coil 20 mounted in two sections on the tube 14.

The end portions of the base plate 10 support fixed capacitors 21 and 22 which are connected respectively with the terminals of the coils 15 and 20. A metal shield can 23 surrounds the base plate 10 and the parts carried thereby, the base plate being supported adjacent one side wall of the shield can by nuts 24 and 25 on the externally threaded ends of the plugs 11 and 12 respectively which extend through the shield can.

With the construction described, the spacing of the tubes 13 and 14 from each other establishes the desired degree of inductive coupling between the coils 15 and 20, and the capacitances of the fixed capacitors 21 and 22 are so selected that they will tune the coils of the coupling device to the desired intermediate frequency, with the cores 16 and 16a in intermediate positions in the tubes 13 and 14.

In Fig. 7, I illustrate the coupling device described, as connected between the vacuum tubes T and T1 of a circuit to constitute a high-frequency amplifying stage. The terminals of the coil 20 are connected with the terminals of the fixed capacitor 22 and by wires 26 and 27 with the plate P of the vacuum tube T and with the positive terminal of a high-voltage source, respectively. The terminals of the coil 15 are connected with the terminals of the fixed capacitor 21 and by wires 28 and 29 with the grid G1 of the vacuum tube T1 and with ground, respectively. The cores 16a and 16 are then adjusted to tune the units of the coupling device to resonance at the desired frequency and to compensate for the electrical conditions peculiar to the particular circuit in which the coupling device is to be employed.

In permeability-tuned intermediate-frequency coupling devices as used heretofore, in which the coils are inductively coupled, the amount of coupling necessarily varies, for resonance at any particular frequency, with changes in the capacitance employed in each resonant circuit. Hence, where coupling devices of the kind under consideration are employed, and the capacitance of the tuned circuit is changed from its original value by variations in the capacitance of the wiring or other parts of the network in which it is incorporated, the inductance of the resonant circuit must be correspondingly and oppositely changed to maintain constant the value $$f_r = \frac{1}{2\pi\sqrt{LC}} \qquad (1)$$

where $f_r$ is the resonant frequency, and L and C are respectively the inductance and capacitance of the resonant circuit involved. This change in inductance is readily effected by adjustment of the ferromagnetic cores, and is effective so far as tuning to resonance is concerned, but any such inductance change effects a change in the mutual inductance and hence in the coupling of the inductively coupled units of the tuning device, producing corresponding changes in the selectivity and gain of the coupling device, unless means are employed to prevent the occurrence of such changes.

When the initial coupling is above optimum coupling where $X_m^2$ is greater than $R_1R_2$, the coupling change will not appreciably change the gain of the coupling device, but will result in a selectivity characteristic of the coupling device having widely varying widths.

For other conditions of initial coupling, although the inductance changes involved in tuning may not produce wide changes in selectivity, they will produce substantial changes in gain. To correct for these changes in selectivity and gain, and maintain them substantially constant, it is necessary to vary the mutual inductance of the coupling device, as well as its $L/R$ or inductance-to-resistance ratio. This I accomplish as below described.

For a conventional intermediate-frequency coupling device, it can be shown that the selectivity is represented by the equation $$\frac{E_r}{E} = \sqrt{1 + \frac{2Q^2(BW)^2}{f_r^2}} \qquad (2)$$

where $E_r$ is the voltage at resonance, $f_r$ is the resonant frequency, E is any other voltage less than $E_r$, $$Q = \frac{\omega L}{R}$$

and BW is the band width.

But since $Q = \omega L/R$ and $\omega$ is equal to $2\pi f$, L is the inductance and R is the resistance of the coupling device, Equation (2) becomes $$BW = \frac{R}{1.41\ 2\pi L}\sqrt{\left(\frac{E_r}{E}\right)^2 - 1} \qquad (3)$$

To satisfy Equation (3) for fixed values of $E_r$ and E in order to maintain a constant value of BW, that is, constant selectivity, the ratio $R/L$ must be maintained constant.

Again, to express the gain of the coupling device, where $Z_1$ is the impedance of the input unit of the device (for example, the coil 20, core 16a, capacitor 22 and attached wiring, Fig. 7), $Z_3$ is the impedance of the output unit of the device (for example, the coil 15, core 16, capacitor 21 and attached wiring, Fig. 7), and $Z_2$ is the mutual reactance of the device (for example, the mutual reactance between the coils 20 and 15, Fig. 7), for a constant voltage across $Z_3$ $$\frac{Z_2}{Z_3} = \frac{X_m}{\frac{L}{CR}} \qquad (4)$$

which expresses the ratio of the input voltage to the output voltage where $X_m$ is the mutual reactance between the units of the coupling device, and L, C and R are respectively the inductance, capacitance and resistance of the output unit of the coupler. This may also be expressed for resonant frequency as $$\frac{Z_2}{Z_3} = X_m C \frac{R}{L} \qquad (5)$$

from which, to maintain a constant gain, the product of the factors $X_m$, $C$ and $R/L$ must be maintained constant, and where the factor $R/L$ is maintained constant, the product of $X_m$ and $C$ must be maintained constant.

In practical operation, however, the voltage across $Z_1$ is not a constant voltage. For example, where the capacitance of the input unit of the coupling device is increased, as it generally is when the device is installed for use, the $$\frac{L}{CR}$$

value or impedance of the input unit is decreased, which correspondingly decreases the voltage across $Z_1$. To maintain a constant gain, the $X_m$ of the coupling device must be correspondingly greater than required to satisfy Equation (5). Therefore by proper choice of the mutual reactance and of the quantity $L/R$, substantially constant gain and selectivity may be obtained.

With the coupling device above described in connection with Figs. 1, 2 and 7, the material of the cores 16 and 16a is so selected that the core losses will vary substantially as the inductance values as the latter are varied by movement of the cores relatively to the coils, as a result of which the effective resistance of the coil is correspondingly varied.

Figures 5, 6:
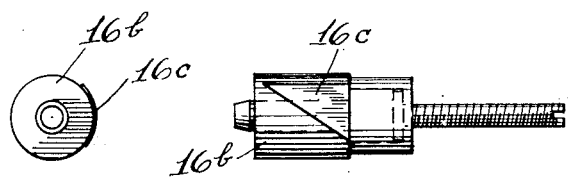
Fig. 5 shows in side elevation to an enlarged scale, a modified form of core that may be used with the coupling devices illustrated.
Fig. 6 is an end view of the core shown in Fig. 5.

In some cases, where the compensating core losses must be considerable, or where the variation of such losses must be of special kind, I find it advisable to use cores of the kind shown at 16b in Figs. 5 and 6. The core itself is made of powdered iron selected to best cooperate with the requirements of the coupling device with which the core is to be used, the iron being formed by pressure and held together by a suitable binder, and carries attached to its surface, for example, by cement, a piece of thin metal foil 16c in which the high-frequency flux in the coil with which the core is used sets up eddy current losses, which add to the losses produced in the core itself. The variation of the losses in the foil 16c relatively to movement of the core 16b axially of the coil with which it is used may be controlled by the shape of the foil, as its width may vary in any desired manner. The core 16b with its attached foil 16c may be used with any of the coupling devices described, in which it is desired to develop losses of the kind described.

A construction of coupling device having a substantially constant selectivity and amplification characteristic is illustrated in Figs. 3 and 4, in which the upper unit consists of a base plate 30, through which an internally threaded plug 31 of suitable material extends to support a tube 32 of insulating material, on the outer end portion of which tube an inductance coil 33 is mounted, the coil being made preferably in two sections as indicated. Between the coil 33 and the base plate 30, the tube 32 supports a coupling coil 34 consisting preferably of two separate and insulated windings wound at the same time and constituting primary and secondary portions thereof, the coil 34 having preferably but few turns compared with coil 33. The base plate 30 supports a fixed capacitor 35, the terminals of which are connected with the terminals of the serially connected coil 33 and the secondary portion of the coil 34. The tube 32 contains a core 36 of compressed ferromagnetic material secured to a screw 37 by a connecting member 38 of insulating material, the screw 37 extending through and fitting the threads in the plug 31, so that by turning the screw in the plug, the core may be moved into and out of the coil 33. When the core is moved out of the coil 33, it is moved towards and into the coil 34, thus increasing the inductance of the coil 34 at the same time that the inductance of the coil 33 is decreased, and oppositely changing the inductances by movement of the core in the other direction.

The externally threaded end of the plug 31 extends through a metal shield can 39 to receive a nut 40 by which the plug is clamped to the shield can to support the base plate 30 near and spaced from one side wall of the shield can, with the latter containing and surrounding the base plate and the parts carried thereby.

The lower unit of the coupling device shown in Figs. 3 and 4 consists of a base plate 41, a plug 42 and a tube 43, all of suitable material and of the same construction and purpose respectively as the base plate 30, plug 31 and tube 32 of the upper unit. The tube 43 supports an inductance coil 44 and a coupling coil 45 constructed and related as above described for the coils 33 and 34 respectively. The tube 43 contains a core 36a (Fig. 4) of the construction and operating on the coils 44 and 45, as described for the core 36 and its operation on the coils 33 and 34. The core 36a is connected with a screw 47 threaded through the plug 42 to operate the core. The base plate 41 supports a fixed capacitor 46 similar to the capacitor 35, and connected with the terminals of the serially connected coil 44 and primary portion of the coil 45. The base plate 41 is supported near and spaced from one side wall of a metal shield can 49 by a nut 50 on the externally threaded end portion of the plug 42 extending through the shield can, which shield can encloses the base plate 41 and the parts carried thereby. The shield can 49 is formed at its upper and closed end portion to enter and snugly fit the lower open end of the shield can 39, thereby completely shielding the upper unit of the coupling device and preventing inductive coupling between the coils 33 and 44. Coupling of the upper and lower units of the device, is effected by connections between the secondary portion of the coil 45 and the primary portion of the coil 34.

As shown in Fig. 8, the coupling device illustrated in Figs. 3 and 4 has its lower or input unit connected by wires 51 and 52 respectively, with the plate P of a first vacuum tube T and with the positive terminal of a high-voltage source, and the output unit of said device is connected by wires 53 and 54 respectively with the grid $G_1$ of a second vacuum tube $T_1$ and ground. In Fig. 8, the primary and secondary portions 45a and 45b respectively of the coupling coil 45 are shown, as are also the primary and secondary portions 34a and 34b respectively of the coupling coil 34. The secondary portion 45b is shown as connected with the primary portion 34a by wires 55 and 58, the wire 56 preferably being grounded as indicated.

The operation of the coupling device schematically illustrated in Fig. 8 is as follows: Assuming that the capacitances of the two tuned circuits of the device are increased by its connection with the vacuum tube T and $T_1$, the cores 36 and 36a are slightly withdrawn from the coils 33 and 44, thereby reducing the inductance value of the coils until Equation (1) is satisfied. At the same time that these inductance values are decreased, the inductance values of the portions 45a and 34b of the coils 45 and 34 are increased, producing corresponding increases in the mutual inductances of the coils 45 and 34, which in turn has the effect of coupling circuits 34b, 33, 35 and 46, 44, 45a more closely. The inductance-to-resistance ratio is so selected that the increase in mutual inductance will maintain substantially constant selectivity and gain. The coupling between the two windings of each of the coils 34 and 45 is close which results in a nearly constant output voltage. At the same time, the increased inductances of the portions 34b and 45a of the coils 34 and 45 respectively, result in a corresponding increase in the mutual inductance of coils 34 and 45, which increases the voltage delivered to the grid circuit of the vacuum tube $T_1$. The coils 34 and 45 are so proportioned as to number of turns and coupling that this increase in mutual inductance compensates for the drop in voltage across the plate circuit of the vacuum tube T which is met in practice, and as a result, the gain of the coupling device is maintained at the value for which it is designed.

The coupling device diagrammatically illustrated in Fig. 9 is of substantially the same construction as that described in connection with Figs. 1, 2 and 7, the principal difference being that magnetic coupling is introduced between the units of the coupling device by means of a cross-bar 57 of compressed ferromagnetic material, so positioned between the tubes 13 and 14 that its ends are closely adjacent the tubes and spaced from the lower ends of the cores 16 and 16a when the cores are in the position of maximum inductance in the coils 15 and 20 respectively. The air gaps between the ends of the cross member 57 and the lower ends of the cores 16 and 16a are of such length that when the cores are moved downwardly in the coils 15 and 20 by the adjusting screws 17 and 19, thereby decreasing the inductance of the coils 15 and 20 respectively, the reluctance of the common magnetic paths of the coils 15 and 20 is decreased, thereby increasing the coupling between the coils 15 and 20. This gives the coupling device illustrated in Fig. 9, more nearly constant selectivity and gain, than that of the coupling device illustrated in Figs. 1, 2 and 7, and by properly proportioning the parts and selecting the materials of the cores 16 and 16a and of cross member 57, the requirements of Equations (1) and (3) are satisfied.

Fig. 10 illustrates schematically the connection of the coupling device shown in Fig. 9 between vacuum tubes T and $T_1$, the terminals of the input unit of the device being connected by wires 58 and 59 respectively with the plate P of the vacuum tube T and with the positive terminal of a high-voltage source, and the terminals of the output unit of the device being connected by wires 60 and 61 respectively with the grid $G_1$ of vacuum tube $T_1$ and ground.

In the coupling device illustrated in Fig. 11, the inductance coils 62 and 63 of the input and output units of the device are contained in shells 64 and 65, respectively, of compressed ferromagnetic material, which entirely surround the outer surfaces and ends of the coils. The shells 64 and 65 are mounted on tubes 66 and 67 respectively, which are of insulating material and are secured to a base plate 68 by means of plugs 69 and 70 and nuts 71 and 72 thereon. The tubes 66 and 67 contain cores 73 and 74 of compressed ferromagnetic material attached to screws 75 and 76 extending with threaded engagement through the plugs 69 and 70 respectively, so that the cores may be moved into and out of the coils 62 and 63 as desired. The terminals of the coils 62 and 63 are respectively shunted by fixed capacitors 77 and 78. The coils are coupled by means of a fixed capacitor 79 connected with one terminal of each of the coils, and the coupling is entirely capacitive since the shells 64 and 65 shield the coils and prevent appreciable inductive coupling between them.

One arrangement for use of the coupling device shown in Fig. 11 is illustrated in Fig. 12, the terminals of the input unit of the device being connected by wires 80 and 81 respectively with the plate P of vacuum tube T and with the positive terminal of a high-voltage source, and the terminals of the output unit of the device being connected by wires 82 and 83 respectively with the grid $G_1$ of the vacuum tube $T_1$ and ground.

The operation of the coupling device shown in Figs. 11 and 12 is generally similar to the operation of the coupling device illustrated in Figs. 1, 2 and 7. By proper selection of the material of the shells 64 and 65 and of the cores 73 and 74, the $L/C$ ratio of each resonant circuit of the device of Figs. 11 and 12 is such that, although the capacitive coupling is fixed, as the resonant resistance $L/CR$ of the input and output circuits of the device decreases to compensate for increased capacitance of the system into which it is connected, the voltage gain becomes greater, which compensates for the decrease in voltage across the input unit of the coupling device which is met in practice.

Figure 13:
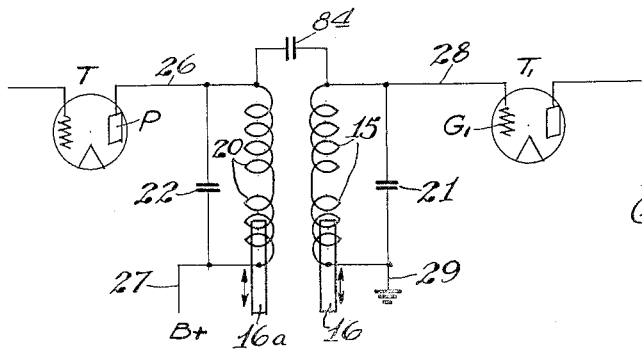
Fig. 13 is a schematic circuit diagram of another use of the coupling device illustrated in Figs. 1 and 2, in which capacitive coupling is employed in addition to the inductive coupling indicated in Fig. 7.

In Fig. 13 I illustrate a use of the coupling device described in connection with Figs. 1 and 2, which is modified only by the connection of a fixed capacitor 84 between the wires 26 and 28, to effect capacitive coupling in addition to the inductive coupling above described as existing between the coils 20 and 15. As far as satisfying Equations (1) and (3) is concerned, the operation of the device shown in Fig. 13 is substantially the same as the operation of the device shown in Fig. 7. The added capacitive coupling afforded by the fixed capacitor 84, however, tends to establish a voltage in the output circuit 15—21 which will, in conjunction with the voltage established across the coil 15 due to current in the coil 20, give an increased or decreased potential between the grid $G_1$ and ground, depending on the value of the inductances of the coils 20 and 15, as well as on the mutual inductance between them. The critical point at which this occurs can be changed as desired, and as a result a characteristic of desired kind may be secured, either rising or falling or remaining constant as the impedance of the input unit decreases.

The coupling device illustrated in Fig. 14 is similar to that above described in connection with Figs. 3, 4 and 8, the difference being that the coupling coils 34 and 45 are replaced by single-layer coupling coils 85 and 86 mounted respectively on the tubes 32 and 43. With this construction, the coupling coil 86 of the input unit of the coupling device is serially connected in circuit with the inductance coil 33 of the output unit of the device by a wire 87, and the coupling coil 85 of the output unit of the device is serially connected in circuit with the inductance coil 44 of the input unit of the device by a wire 88. As a result the coupling is inductive as to the relation between each of the coupling coils and the inductance coil of the same unit, and conductive between the units of the coupler. The coupler illustrated in Fig. 14 is shown schematically in use in Fig. 15, in which the terminals of the serially connected coils 44 and 85 are connected by wires 89 and 90 respectively with the plate P of vacuum tube T and with the positive terminal of a high-voltage source, and the terminals of the serially connected coils 33 and 86 are connected by wires 91 and 92 respectively with the grid G₁ of vacuum tube T₁ and ground.

With the coupling device illustrated in Figs. 14 and 15, the operation is much the same as that described above in connection with the device of Figs. 3, 4 and 8, the principal difference being that the induced voltage developed in each of the coupling coils 85 and 86 is communicated conductively and directly to the inductance coil of the other unit of the coupling device, instead of being so transferred by a second inductive link as illustrated in Fig. 8. The coupling device shown in Figs. 14 and 15 operates, therefore, somewhat more efficiently than does the coupling device illustrated in Figs. 3, 4 and 8; by properly proportioning the parts, the selectivity and gain of the coupling device of Figs. 14 and 15 may be maintained substantially constant in the manner described for the coupling device illustrated in Figs. 3, 4 and 8.

The coupling device illustrated schematically in Fig. 16 is a modification of the coupling device illustrated in Figs. 14 and 15, in that a single link circuit between the units of the coupling device is employed, instead of two such link circuits as illustrated in Fig. 15, the coupling coil 85 being omitted, and the coil 44 being connected directly with the positive terminal of the high-voltage source by a wire 93. The operation of the coupling device illustrated in Fig. 16 is substantially the same as that described in connection with Figs. 14 and 15.

From the above it will appear that by my invention I provide for maintaining substantially constant the selectivity and gain of permeability-tuned intermediate-frequency coupling devices during the adjustment which may be required to tune the coupling devices to a fixed predetermined intermediate frequency in spite of electrical inequalities in the receivers in which the coupling devices are intended to be used. My invention may be embodied in different types of such coupling devices, depending upon the requirements of different cases. In applications in which the required tuning range of the coupling device can be maintained within relatively narrow limits, the coupling device may be of comparatively simple and inexpensive construction, but where substantially uniform gain and selectivity over a relatively wide tuning range is required, it may be necessary to employ one of the somewhat more elaborate types of coupling devices herein disclosed. For example, the construction of the coupling device illustrated in Figs. 3, 4 and 8 is well adapted to general use in radio receivers having widely different electrical variations, and with such coupling devices there is no need to particularly design the coupling device for any particular use, except that the particular intermediate frequency to be employed must be included within the range of frequencies which the coupling device is designed to cover.

In its broad aspect, therefore, my invention consists of providing means in a permeability-tuned intermediate-frequency coupling device by which, on changing the inductance of the coupling device to compensate for electrical differences incident to its use, electrical factors of the coupling device will be automatically changed to maintain substantially constant both the selectivity and the gain of the coupling device.

While I have shown my invention in the particular embodiments above described, it will be understood that I do not limit myself thereto, as I may employ equivalents known to the art of the various devices employed without departing from the scope of the appended claims.

Having thus described my invention, what I claim is:

1. A selective radio-frequency coupling device including in combination input and output circuits each having an inductor and a fixed capacitor and being initially resonant at a desired frequency, means for adjusting the inductance of each of said circuits to compensate for changes in the capacitance thereof due to conditions of use to thereby maintain resonance at said frequency, said circuits being inductively coupled, and a member of magnetic material and of low reluctance between said inductors to magnetically coupled said circuits, said couplings being adapted to maintain the selectivity and the gain of said coupling device substantially constant regardless of said inductance adjustment.

2. A selective radio-frequency coupling device including in combination input and output resonant circuits each having an inductor and a fixed capacitor and being initially resonant at a desired frequency, means for adjusting the inductance of each of said circuits to compensate for changes in the capacitance thereof due to conditions of use to thereby maintain resonance at said frequency, a first link circuit inductively coupled with a first one of said resonant circuits and conductively connected with the second of said resonant circuits, and a second link circuit inductively coupled with said second resonant circuit and conductively connected with said first resonant circuit, said link circuits being adapted to maintain the selectivity and gain of said coupling device substantially constant regardless of said inductance adjustment.

3. A selective radio-frequency coupling device including in combination input and output resonant circuits each having an inductor and a fixed capacitor, inductance-adjusting means associated with each of said inductors for tuning the corresponding circuit to resonance at a desired frequency, said resonant circuits being inductively coupled, and a member of magnetic material and of low reluctance between said inductors to magnetically couple said circuits, said inductance-adjusting means and said couplings cooperating to produce a desired ratio of inductance to effective resistance for each of said resonant circuits and to maintain the resonant response of said output resonant circuit substantially constant regardless of said inductance adjustment.

4. A selective radio-frequency coupling device including in combination input and output resonant circuits each having an inductor and a fixed capacitor, a ferromagnetic core movable into and out of each of said inductors to adjust its circuit to a desired frequency and to compensate for changes in the capacitance therof due to conditions of use, a coupling coil associated with each of said inductors and having its inductance changed inversely to the inductance changes of said inductors by movement of the associated core, and a link circuit inductively coupled to said coupling coils, said cores and coupling means cooperating to produce a desired ratio of inductance to effective resistance for each of said resonant circuits and to maintain the gain of said coupling device substantially constant regardless of movement of said cores.

5. A selective radio-frequency coupling device including in combination input and output resonant circuits each having an inductor and a fixed capacitor, a ferromagnetic core movable into and out of each of said inductors to adjust its circuit to a desired frequency and to compensate for changes in the capacitance thereof due to conditions of use, a coupling coil associated with each of said inductors and having its inductance changed inversely to the inductance changes of said inductors by movement of the associated core, and a conductive connection between each of said coupling coils and the inductor of the other resonant circuit, said coupling coils and said conductive connections cooperating to produce a desired ratio of inductance to effective resistance for each of said resonant circuits and to maintain the gain of said coupling device substantially constant regardless of movement of said cores.

6. A selective radio-frequency coupling device including in combination input and output resonant circuits each having an inductor and a fixed capacitor, a ferromagnetic core movable into and out of each of said inductors to adjust its circuit to a desired frequency and to compensate for changes in the capacitance thereof due to conditions of use, a coupling coil associated with one of said inductors and having its inductance changed inversely to the inductance changes of said inductors by movement of the associated core, and a conductive connection between said coupling coil and the inductor of the other resonant circuit, said coupling coil and said conductive connection cooperating to produce a desired ratio of inductance to effective resistance for each of said resonant circuits and to maintain the gain of said coupling device substantially constant regardless of movement of said cores.

WILLIAM A. SCHAPER.

CERTIFICATE OF CORRECTION.

Patent No. 2,141,254. December 27, 1938.

WILLIAM A. SCHAPER.

It is hereby certified that error appears in the printed specification of the above numbered patent requiring correction as follows: Page 2, second column, line 67, after "voltage" insert the words and comma of the coupling device,; page 3, second column, line 61, for the reference numeral "58" read 56; line 68, for "tube T and T" read tubes T and $T_1$; page 5, second column, line 22, claim 1, for "coupled" read couple; and that the said Letters Patent should be read with this correction therein that the same may conform to the record of the case in the Patent Office.

Signed and sealed this 21st day of February, A. D. 1939.

Henry Van Arsdale.

(Seal) Acting Commissioner of Patents.